US011423078B2

(12) United States Patent
Mayster et al.

(10) Patent No.: US 11,423,078 B2
(45) Date of Patent: Aug. 23, 2022

(54) MAP SEARCH RECOMMENDATION SYSTEM BASED ON IMAGE CONTENT ANALYSIS DRIVEN GEO-SEMANTIC INDEX

(71) Applicant: Google LLC, Mountain View, CA (US)

(72) Inventors: Yan Mayster, Aurora, CO (US); Brian Daniel Shucker, Superior, CO (US)

(73) Assignee: GOOGLE LLC, Mountain View, CA (US)

( * ) Notice: Subject to any disclaimer, the term of this patent is extended or adjusted under 35 U.S.C. 154(b) by 42 days.

(21) Appl. No.: 17/251,399

(22) PCT Filed: Jan. 7, 2019

(86) PCT No.: PCT/US2019/012527
§ 371 (c)(1),
(2) Date: Dec. 11, 2020

(87) PCT Pub. No.: WO2020/131138
PCT Pub. Date: Jun. 25, 2020

(65) Prior Publication Data
US 2021/0248180 A1    Aug. 12, 2021

Related U.S. Application Data

(60) Provisional application No. 62/782,732, filed on Dec. 20, 2018.

(51) Int. Cl.
*G06F 16/587* (2019.01)
*G06F 16/538* (2019.01)
(Continued)

(52) U.S. Cl.
CPC ......... *G06F 16/587* (2019.01); *G06F 16/538* (2019.01); *G06F 40/174* (2020.01);
(Continued)

(58) Field of Classification Search
CPC ...... G06F 16/587; G06F 16/538; G06F 40/30; G06F 40/174
(Continued)

(56) References Cited

U.S. PATENT DOCUMENTS 8,719,198 B2      5/2014  Zheng et al.
9,177,029 B1 *  11/2015  Chau ................... G06F 16/9535
(Continued)

FOREIGN PATENT DOCUMENTS

WO       WO 01/98925       12/2001

OTHER PUBLICATIONS

International Preliminary Report on Patentability for Application No. PCT/US2019/012527, dated Jul. 1, 2021, 8 pages.
(Continued)

*Primary Examiner* — Kimberly L Wilson
(74) *Attorney, Agent, or Firm* — Dority & Manning, P.A.

(57) ABSTRACT

The present disclosure provides systems and methods that enable map search recommendations based on a geo-semantic index developed using image content analysis. In one example, a computer-implemented method can include obtaining, by one or more computing devices, a vocabulary of image feature types associated with user activities. The method can include obtaining a collection of imagery. The method can include performing image content analysis on the collection of imagery based on the vocabulary of image feature types. The method can include generating at least one activity score for each of a plurality of location cells in a geo-semantic index based at least in part on the vocabulary of image feature types. The method can include populating the geo-semantic index of location cells, the geo-semantic index of location cells including data indicative of the at least one activity score for each location cell. The method can include providing the geo-semantic index of location
(Continued)

cells for use in generating location recommendations in response to a query.

20 Claims, 6 Drawing Sheets

(51) Int. Cl.
   *G06F 40/30*   (2020.01)
   *G06F 40/174*  (2020.01)
   *G06V 10/40*   (2022.01)
   *G06V 20/13*   (2022.01)

(52) U.S. Cl.
   CPC .............. *G06F 40/30* (2020.01); *G06V 10/40* (2022.01); *G06V 20/13* (2022.01)

(58) Field of Classification Search
   USPC ........................................................ 707/724
   See application file for complete search history.

(56) References Cited

U.S. PATENT DOCUMENTS

| | | | |
|---|---|---|---|
| 2014/0075004 A1* | 3/2014 | Van Dusen | G06Q 30/0201 |
| | | | 709/223 |
| 2015/0227634 A1 | 8/2015 | Wood et al. | |
| 2018/0160036 A1* | 6/2018 | Chenny | H04N 5/77 |

OTHER PUBLICATIONS

International Search Report for PCT/US2019/012527, dated May 22, 2019, 2 pages.
Krylov, "Automatic Discovery and Geotagging of Objects from Street View Imagery", arXiv: 1708.08417v2, Dec. 1, 2017, 10 pages.
Papageorgiou et al, "A Trainable System for Object Detection", International Journal of Computer Vision, vol. 38, 2000, 20 pages.
Sengupta, "Automatic dense visual semantic mapping from street-level imagery", 2012 IEEE/RSJ International Conference on Intelligent Robots and Systems, Vilamoura, Oct. 7-12, 2012, pp. 857-862.

* cited by examiner

300A

300B

600A

600B

MAP SEARCH RECOMMENDATION SYSTEM BASED ON IMAGE CONTENT ANALYSIS DRIVEN GEO-SEMANTIC INDEX

PRIORITY CLAIM

This application is based upon and claims the right of priority under 35 U.S.C. § 371 to International Application No. PCT/US2019/012527 filed on Jan. 7, 2019, which claims the benefit of U.S. Provisional Application Ser. No. 62/782,732 filed Dec. 20, 2018. Applicant claims priority to and the benefit of each of such applications and incorporates all such applications herein by reference in their entirety.

FIELD

The present disclosure relates generally to search recommendations. More particularly, the present disclosure relates to the use of image content analysis and a geo-semantic index to enable search recommendations.

BACKGROUND

Users often would like to look for locations that can accommodate certain human activity needs. However, typical search queries may fail to yield results that are of value to the user when searching for nearby locations with certain facilities and/or physical attributes. For example, a user may utilize a mapping application to view a map of an area and attempt to visually determine locations for a particular activity or search for manually labeled elements that may indicate the availability of a physical activity. Such search techniques may be cumbersome and may yield inconsistent or incorrect results. For example, facilities and/or attributes may be unmapped and/or too numerous or highly prone to change. Thus, improved systems for map searching to identify locations associated with activities are needed.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method that includes obtaining, by one or more computing devices, a vocabulary of image feature types associated with user activities. The method includes obtaining, by the one or more computing devices, a collection of imagery. The method includes performing, by the one or more computing devices, image content analysis on the collection of imagery based on the vocabulary of image feature types. The method includes generating, by the one or more computing devices, at least one activity score for each of a plurality of location cells in a geo-semantic index based at least in part on the vocabulary of image feature types. The method includes populating, by the one or more computing devices, the geo-semantic index of location cells, the geo-semantic index of location cells including data indicative of the at least one activity score for each location cell. The method includes providing, by the one or more computing devices, the geo-semantic index of location cells for use in generating location recommendations in response to a query.

Other aspects of the present disclosure are directed to various systems, apparatuses, non-transitory computer-readable media, user interfaces, and electronic devices. It will be appreciated that aspects described above in the context of one form may be implemented in any other convenient form. Features described in the context of one aspect may be implemented in the context of another aspect.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
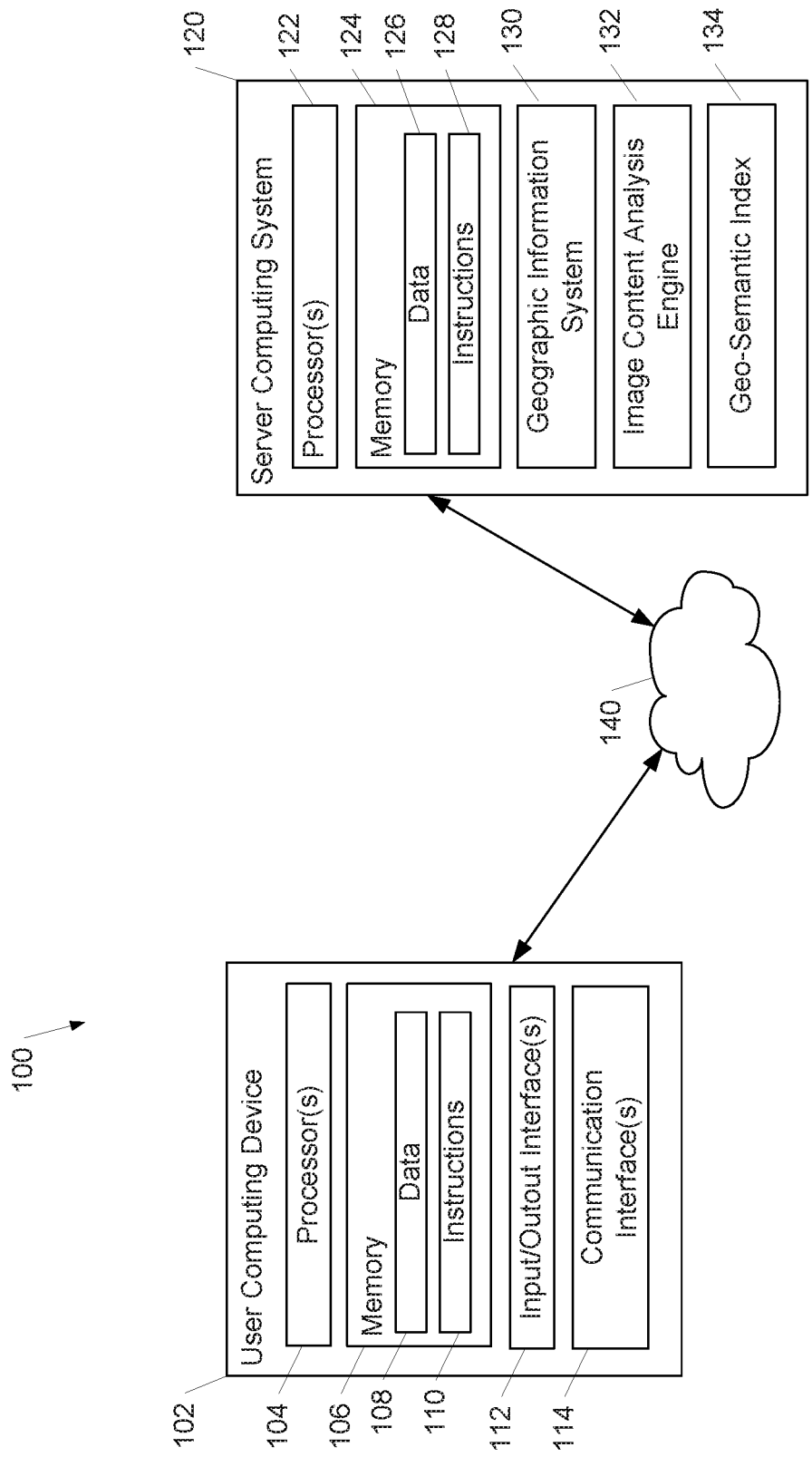
FIG. 1 depicts a block diagram of computing system according to example embodiments of the present disclosure.

Reference numerals that are repeated across plural figures are intended to identify the same features in various implementations.

DETAILED DESCRIPTION

Overview

Generally, the present disclosure is directed to systems and methods that enable map search recommendations based on a geo-semantic index developed using image content analysis. In particular, the systems and methods of the present disclosure can facilitate the generation of a geo-semantic index of locations that identifies feature and/or attribute types associated with user activities and the use of such a geo-semantic index to provide map search recommendations including one or more geographic locations that may accommodate particular user activities. For example, a user may want to search for nearby locations that can accommodate a particular user activity (e.g., nearby places that are kid-friendly, playgrounds with shady areas, places where one can sit and read, etc.). A geo-semantic index of locations including rich semantic contextual information for each location can be constructed based on image content analysis (e.g., analyzing periodic collections of street-level imagery and/or the like to identify features/attributes associated with activities, etc.). The geo-semantic index can then be used to identify location cells within some geographic area (e.g., a fixed radius of the user location, etc.) that can accommodate the desired activity (e.g., based on location cell activity scores, etc.). The identified locations can be provided to the user as part of query result recommendations (e.g., mapped locations, list of locations, etc.). In some cases, the location recommendations can include descriptions of the locations based on the activity and features/attributes associated with the locations. Thus, systems and methods of the present disclosure can provide for answering user queries for locations with requested features and/or attributes that can accommodate specific activities in a more comprehensive manner and guide the user to such locations.

More particularly, according to one aspect of the present disclosure, a computing system can facilitate the construction and periodic updating of a geo-semantic index of locations (e.g., on a grid of location cells) having rich semantic contextual information for each location generated using an image content analysis engine. Image content analysis systems can recognize a wide array of semantic elements (e.g., on the order of tens of thousands of elements), many of which refer to features and/or attributes of the physical and urban landscape. Such image content analysis systems can be tasked to process very large image corpora on a periodic basis. The geo-semantic index can provide a semantic context map of the world using actual knowledge of physical places deduced from collected imagery and facilitate search recommendations for places that can support desired activities and/or recommendations for activities within a certain area.

According to an aspect of the present disclosure, a computing system can provide for cataloguing a vocabulary of known feature and/or attribute types (e.g., from an image content analysis lexicon, etc.) along with the user activities that they can accommodate (e.g., that search users and applications are likely to be interested in). For example, such feature/attribute vocabulary could include "bench" for reading; "alley" for walking; "loading zone" or "parking meter" for a passenger pick-up or parking; "statue," "fountain," or "boutique" for meet-ups; and/or the like. The feature/attribute vocabulary can have a many-to-many relationship between activities and vocabulary terms. In some implementations, the feature/attribute vocabulary can include verb attribute terms in addition to physical features/attributes, for example, identifying people reading and/or the like in imagery.

The computing system can periodically obtain collections of imagery (e.g., street-level imagery, aerial imagery, etc.) for example, from a continuously updated imagery corpus, publicly available imagery, user-generated imagery, and/or the like. The computing system can perform image content analysis on the obtained imagery to identify feature/attribute type terms from the generated vocabulary. Based on the identified features/attributes, the computing system can populate and/or update a geo-semantic index of location cells associated with the imagery (e.g., on a grid of location cells mapped to a geographic area). The geo-semantic index may also include data regarding collection times for the imagery having the identified features/attributes. In some implementations, the index can be continuously updated for matching features/attributes to activities, for example, via manual updates from human operators, based on user feedback, and/or the like. In some implementations, the image content analysis may include filtering out certain image data, such as features/attributes identified in private and/or restricted areas, and/or the like.

For every activity supported by the vocabulary, the computing system can generate a weighted activity score for each location cell based at least in part on the amount, diversity, and/or recency of the semantic terms corresponding to the activities that are associated with the location cell. In some implementations, the activity scores can be generated based on one or more metric definitions provided by a client application associated with that activity. For example, a number of user applications are focused on specific human activities which can be supported by search recommendation using such a geo-semantic index as described herein. In some implementations, some of the activities in the geo-semantic index and/or vocabulary may be defined solely based on the needs of a specific user application that defines the activity and the metric for the activity score. In some implementations, the activity scoring can be different based on the type of activity, the type of application, and/or the like, for example, based on the elements that may be important or essential to the activity. The generation of such activity scores, along with the repeated refresh of information provided through the image content analysis from a large imagery corpus (e.g. street-level imagery corpus, etc.), can enable the functionality of the geo-semantic index in providing more comprehensive recommendations to users based on desired activities.

According to another aspect of the present disclosure, a computing system can obtain a query from a user with regard to nearby locations that can accommodate a particular user activity. The computing system can analyze the geo-semantic index to identify one or more high scoring location cells that are nearby (e.g., within a fixed radius of the search area indicated by the user, around the user current location, etc.) and provide one or more of those locations that match the desired activity as search recommendations. In some implementations, for each location, the computing system can generate a textual description based on the features/attributes and/or activities associated with the location. For example, in some implementations, such descriptions can be generated based on an application of natural language processing, can be curated by human operators, and/or the like. These location descriptions can be provided to the user as part of the location recommendations to assist the user in selecting and/or finding the desired location.

For example, a user query may be submitted to the computing system such as "Find a place where I can walk and enjoy some shade." The computing system can screen the query submission for any known activity words associated with the vocabulary, for example, the system could identify "walk" and "enjoy shade" as activity terms in the vocabulary. The computing system can analyze the index to identify one or more location cells that have a high match for these activities based on the presence of certain vocabulary terms in the cells. Thus, the identified cell locations may have among their descriptive features terms such as "alley," "trees," "sidewalk," "gravel path," and/or other similar terms. The computing system can return one or more of the identified locations as recommendations to the user, for example, based in part of the activity scores associated with the identified location cells.

In some implementations, a geo-semantic index can be used to provide recommendations of one or more activities within a certain geographic area as opposed to recommendations for locations to accommodate a specific activity. For example, rather than answering a query of "Where can I do <specific_activity>", the computing system can use the geo-semantic index to answer a request of "Please recommend activities that I can do within X meters of my location." In such cases, the same geo-semantic index can use the current location of the user along with the semantic elements stored in the index (e.g., developed based on the image content analysis) to provide recommendations for certain activities that are supported by these elements within the specified geographic area.

In some cases, such activity queries may not necessarily be issued by the user directly via desktop search or voice assistant. Rather, the potential users may also interact with a recommendation system through their use of various client applications (e.g., via RPC calls). Many applications are focused on specific human activities that the geo-semantic index can support. Some good examples can include applications for meet-ups, ride-hailing, sports and outdoor exercise, virtual reality gaming, dog walking, bird watching, and/or the like. Each kind of application may need to have its activity terms defined as well as specific weights and metric functions with any additional algorithmic filtering criteria (e.g., avoiding roads or residential buildings with a specific distance margin, etc.). According to some aspects, the systems and methods of the present disclosure can provide an interface for any application that needs knowledge of public space to power its activity-based feature set to users. As an example, in the case of passenger pick-ups, the computing system may return locations that have "loading zone" signs, parking meters, highly visible landmarks, and other terms that make a place easy to find for both the driver and the passenger as well as to easily and legally stop a vehicle at and pick up a person. In the example of meet-ups, the activity score of a location cell may factor in terms that make a place highly "walkable," for example, having elements such as "walk path" and/or various pedestrian facilities, "fountain," "sculpture," and/or the like.

According to some aspects, a computing system can obtain a vocabulary of image feature types associated with user activities. The vocabulary may include data that identifies the image feature types. A plurality of activity types can each be associated with a respective subset of image feature types from the vocabulary of image feature types. The computing system can obtain a collection of imagery such as a collection of images. The computing system can perform image content analysis on the collection of imagery based on the vocabulary of image feature types. For example, the computing system may determine whether corresponding imagery for each of a plurality of location cells of a geo-semantic index includes feature types from the vocabulary of image feature types. The computing system can generate at least one activity score for each of the location cells in the geo-semantic index based on the vocabulary of image feature types. For each location cell, the computing system can determine an activity score for each activity type based at least in part on whether the location cell includes some respective subset of image feature types for such activity type. The computing system can populate the geo-semantic index of location cells with data indicative of the at least one activity score for each location cell. The computing system can provide the geo-semantic index of location cells for use in generating location recommendations in response to a query.

The systems and methods described herein provide a number of technical effects and benefits. For instance, the systems and methods of the present disclosure can provide improvements to search recommendation systems. The systems and methods can, for example, enable querying for nearby locations based on the presence of certain facilities and/or attributes that are likely to be as yet unmapped and/or too numerous or highly prone to change. The latter in particular can make it infeasible to rely solely on fixed permanent records of such entities (e.g., user-reported), without the ability to automatically refresh them. Thus, systems and methods of the present disclosure can provide for answering user queries for locations with requested features and/or attributes that can accommodate specific activities in a more comprehensive manner and guide the user to such locations.

According to some aspects, an improved search recommendation system and/or related user-interface can be provided by associating locations with activities based on image content analysis. Image content analysis of imagery associated with a location can be used to identify the presence of features that correspond to a vocabulary of image features. The image features in the vocabulary can be associated with activities or activity types. As such, a geo-semantic index as described herein can include information associated with activities at a particular location, where those activities are determined based on image content analysis. Such techniques may represent improvements over manual or other processes.

With reference now to the Figures, example embodiments of the present disclosure will be discussed in further detail.

Example Devices and Systems

FIG. 1 depicts a block diagram of an example computing system 100 that can facilitate search recommendations based on a geo-semantic index developed using image content analysis according to example embodiments of the present disclosure. The system 100 is provided as one example only. Other computing systems that include different components can be used in addition or alternatively to the system 100. The system 100 can include one or more user computing devices, such as a user computing device 102 and one or more remote computing devices, such as server computing system 120 that are communicatively coupled over one or more networks, such as communication network 140. Although only one user computing device is illustrated in FIG. 1, any number of user computing devices can be connected to the server computing system 120 over the network 140.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 104 and one or more memories 106. The one or more processors 104 can be any suitable processing device (e.g., a processor core, a microprocessor, an ASIC, a FPGA, a controller, a microcontroller, etc.) and can be one processor or a plurality of processors that are operatively connected. The one or more memories 106 can include one or more non-transitory computer-readable storage mediums, such as RAM, ROM, EEPROM, EPROM, flash memory devices, magnetic disks, etc., and combinations thereof. The one or more memories 106 can store data 108 and instructions 110 which are executed by the processor 104 to cause the user computing device 102 to perform operations, such as described herein. More particularly, as described herein, a user computing device 102 can generate query requests and receive response data from the server computing system 120 over the communication network 140.

The user computing device 102 can also include one or more input/output interface(s) 112. One or more input/output interface(s) 112 can include, for example, devices for receiving information from or providing information to a user, such as through a display device, touch screen, touch pad, mouse, data entry keys, an audio output device such as one or more speakers, a microphone, camera, haptic feedback device, etc. The user computing device 102 can also include one or more communication/network interface(s) 114 used to communicate with one or more systems or devices, including systems or devices that are remotely located from the user computing device 102.

The server computing system 120 can include one or more processors 122 and a one or more memories 124. The one or more processors 122 can be any suitable processing device (e.g., a processor core, a microprocessor, an ASIC, a FPGA, a controller, a microcontroller, etc.) and can be one processor or a plurality of processors that are operatively connected. The one or more memories 124 can include one or more non-transitory computer-readable storage mediums, such as RAM, ROM, EEPROM, EPROM, flash memory devices, magnetic disks, etc., and combinations thereof. The one or more memories 124 can store data 126 and instructions 128 which are executed by the processor 122 to cause the server computing system 120 to perform operations, such as described herein, including providing for image content analysis, generating and/or maintaining a geo-semantic index, facilitating search recommendations, and/or the like.

In some implementations, the server computing system 120 can include or be otherwise implemented by one or more server computing devices. In instances in which the server computing system 120 includes plural server computing devices, such server computing devices can operate according to sequential computing architectures, parallel computing architectures, or some combination thereof.

In some implementations, the server computing system 120 can host a geographic information system 130, such as a geographic information system associated with a mapping service. The geographic information system (GIS) 130 can implement a mapping application, a virtual globe application, or any other suitable GIS. The GIS 130 can provide for the archiving, retrieving, and manipulation of geospatial data that has been indexed and stored according to geographic coordinates, such as latitude, longitude, and altitude coordinates, associated with the geospatial data. The GIS 130 can combine satellite imagery, photographs, maps, models, and other geographic data, and Internet search capability so as to enable a user to view imagery of the planet (e.g. map data associated with a plurality of geographic areas) and related geographic information (e.g., locales such as islands and cities, points of interest such as local restaurants, hospitals, parks, hotels, and schools, etc.). The GIS 130 can further allow a user to conduct local searches, to get travel directions to a location or between two locations, or to otherwise retrieve map data for a selected region. Results can be displayed in a two-dimensional or three-dimensional representation of the area of interest. In some implementations, the user can pan, tilt, and rotate the view to see three-dimensional terrain and buildings.

The GIS 130 can provide search results, recommendations, and/or the like (e.g., in response to a user query, etc.) based at least in part on a geo-semantic index as described herein. For example, GIS 130 can include or otherwise be provided access to a geo-semantic index, such as geo-semantic index 134, which can include semantic context associated with a plurality of location cells (e.g., features, attributes, activities, etc. associated with each location cell), wherein the geo-semantic index can be populated and/or updated based on image content analysis, manual entry, and/or the like.

According to an aspect of the present disclosure, the server computing system 120 can include an image content analysis engine 132 that can facilitate implementation of embodiments of the present disclosure. For example, the server computing system 120 can obtain data comprising a collection of imagery, such as for example, street-level imagery collected on a periodic basis. The image content analysis engine 132 can be tasked to process obtained imagery data on a periodic basis to recognize semantic elements which refer to features and/or attributes of the physical landscape, for example associated with one or more human activities and catalogued in a vocabulary of feature/attribute types as described herein. For instance, feature/attribute types may be associated with or indicative of physical objects and/or the physical landscape within the imagery, such as structures, infrastructure, buildings, objects, and/or the like. For example, features/attributes may include "playground," "park," "alley," "path," "boutique," "loading zone", "parking meter," "bench," "fountain," "statute," "artwork," "tree,", "bush," and/or the like. In some implementations, data indicative of features within imagery may include one or more feature vectors indicative of one or more aspects of the identified feature.

According to an aspect of the present disclosure, the server computing system 120 can include a geo-semantic index 134. The geo-semantic index 134 can comprise an index of geographic of locations including rich semantic contextual information for each location constructed and maintained based on image content analysis, for example, provided by image content analysis engine 132. As an example, the geo-semantic index may include, for each location cell, data indicative of one or more features/attributes identified in imagery associated with the location cell (e.g., bench, path, fountain, mural, parking meter, playground, etc.), data regarding of collection time(s) (e.g., timestamps, etc.) of analyzed images having the identified features/attributes, one or more activity scores for user activities associated with and/or accommodated by the identified features/attributes in a location cell, one or more textual descriptions based on the features/attributes and/or activities associated with the location cell, and/or the like.

For example, obtained imagery associated with location cells in the geo-semantic index may be processed by an image content analysis system (e.g., image content analysis engine 132) to identify one or more features in the image that are included within a feature vocabulary associated with the geo-semantic index (e.g., playground, bench, fountain, parking meter, tree, path, etc.). The one or more features identified within the imagery associated with a location cell can be matched to one or more user activities associated with and/or accommodated by the features (e.g., using the feature vocabulary associated with the geo-semantic index). One or more activity scores can be generated for each location cell, for example, based on the type of features identified, the number of features identified, the diversity of features identified, the recency of the features identified (e.g., time since the imagery including the feature was collected), and/or the like corresponding to the activities that are associated with the location cell.

The geo-semantic index 134 can be used to identify locations within some geographic area can accommodate a desired user activity (e.g., based on data obtained from user computing device 102 associated with a search query, etc.). The server computing device 120 can provide the identified location data, for example, to user computing device 102, as part of query result recommendations (e.g., mapped locations, list of locations, etc.).

The server computing system 120 can also include one or more communication/network interface(s) used to communicate with one or more systems or devices, including systems or devices that are remotely located from the server computing system 120, such as user computing device 102, for example. The server computing system 120 can also include one or more input/output interface(s).

The network 140 can be any type of communications network, such as a local area network (e.g., intranet), wide area network (e.g., Internet), or some combination thereof and can include any number of wired or wireless links. In general, communication over the network 140 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Example Imagery

Figure 2:
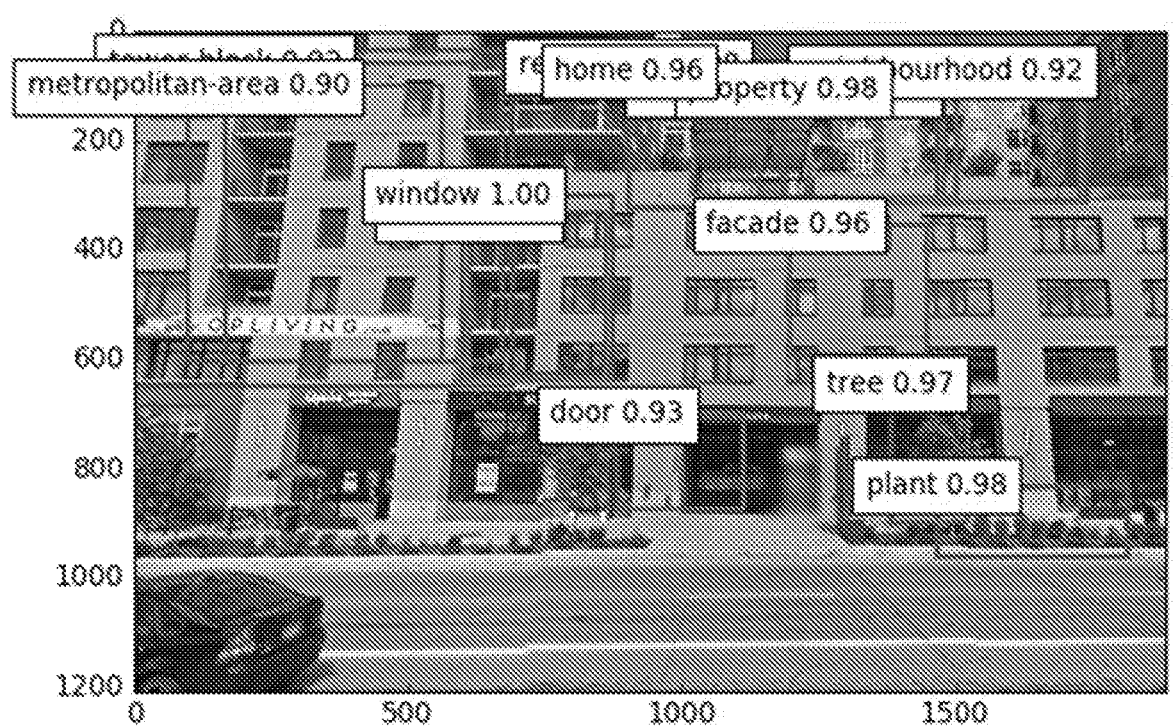
FIG. 2 depicts an example of a street level image with identified features according to example embodiments of the present disclosure.

FIG. 2 depicts an example street-level image 200 with features identified using an image content analysis system according to example embodiments of the present disclosure. As illustrated in FIG. 2, a street-level image 200 can be obtained as part of an imagery corpus and processed by an image content analysis system (e.g., image content analysis engine 132 of FIG. 1) to identify one or more features and/or attributes within the image 200. In particular, an image content analysis system may identify various features within image 200 to facilitate the creation and/or updating of a geo-semantic index as described herein. The image 200 may be associated with a location cell within the geo-semantic index and the featured/attributes identified may be used to periodically update data associated with the location cell within the geo-semantic index. In some implementations, an image content analysis system may identify features along with a confidence level indicative of the presence of the identified feature within the image 200, such as windows, doors, trees, plants, etc. as illustrated in FIG. 2 (e.g., "window 1.00", "door 0.93", "tree 0.97", etc.). The identified features/attributes can be compared to a vocabulary of features/attributes associated with the geo-semantic index (e.g., features/attribute types associated with user activity types maintained within the geo-semantic index) and used to facilitate updating of the geo-semantic index (e.g., generating/updating data associated with a location cell, generating/updating activity scores for a location cell associated with the image 200, etc.).

For example, obtained imagery (e.g., image 200) can be processed by the image content analysis system to identify one or more features/attributes located within the imagery that are associated with the vocabulary (e.g., vocabulary associating features/attributes with activities accommodated by the features/attributes) of the geo-semantic index. The one or more features/attributes identified within the imagery can be matched to one or more user activities associated with and/or accommodated by the features, for example, using the vocabulary associated with the geo-semantic index. One or more activity scores can be generated for each location cell in the geo-semantic index, for example, based on the type of features identified, the number of features identified, the diversity of features identified, the recency of the features identified (e.g., time since the imagery including the feature was collected), and/or the like corresponding to the activities that are associated with the location cell.

Figure 3A:
FIGS. 3A-3B depict an example of street level images according to example embodiments of the present disclosure.
Figure 3B:
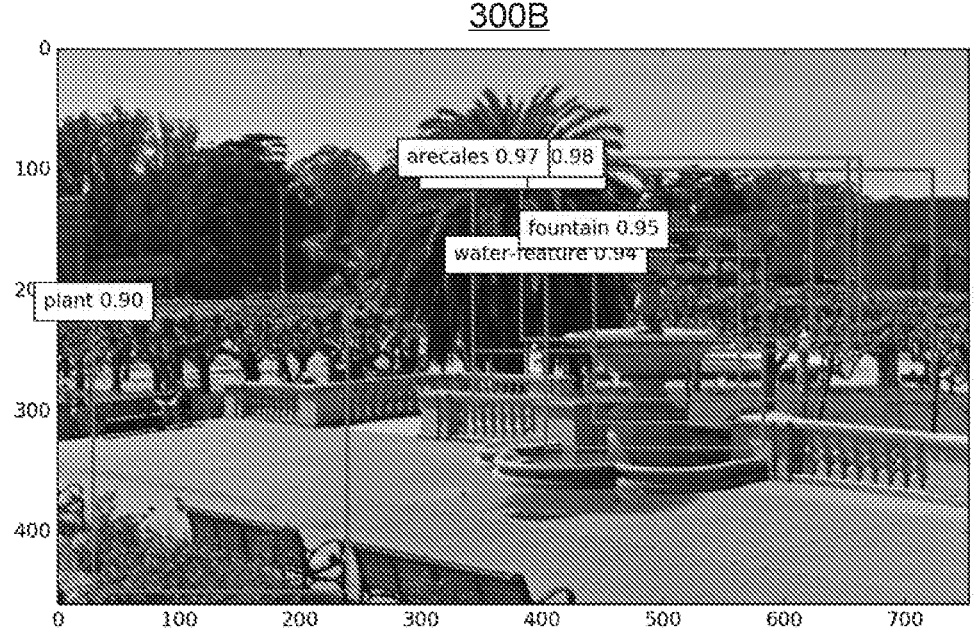

FIGS. 3A and 3B depict example street level imagery according to example embodiments of the present disclosure. As illustrated in FIG. 3A, a street-level image 300A can be obtained as part of an imagery corpus and processed by an image content analysis system (e.g., image content analysis engine 132 of FIG. 1) to identify features and/or attributes as illustrated in image 300B of FIG. 3B. In particular, an image content analysis system may identify various features/attributes within image 300A/300B, such as identifying that the image is associated with attributes of a public space such as a park, that the image contains features such as a water feature, a fountain, plants, and/or the like. The identified features/attributes may be associated with a vocabulary of a geo-semantic index (e.g., vocabulary associating features/attributes with activities accommodated by the features/attributes). The image 300A/300B may be associated with a location cell within the geo-semantic index and the features/attributes identified may be used to generate and/or update data associated with the location cell within the geo-semantic index (e.g., generating/updating feature data associated with a location cell, generating/updating activity scores for a location cell associated with the image, etc.).

Figure 6A:
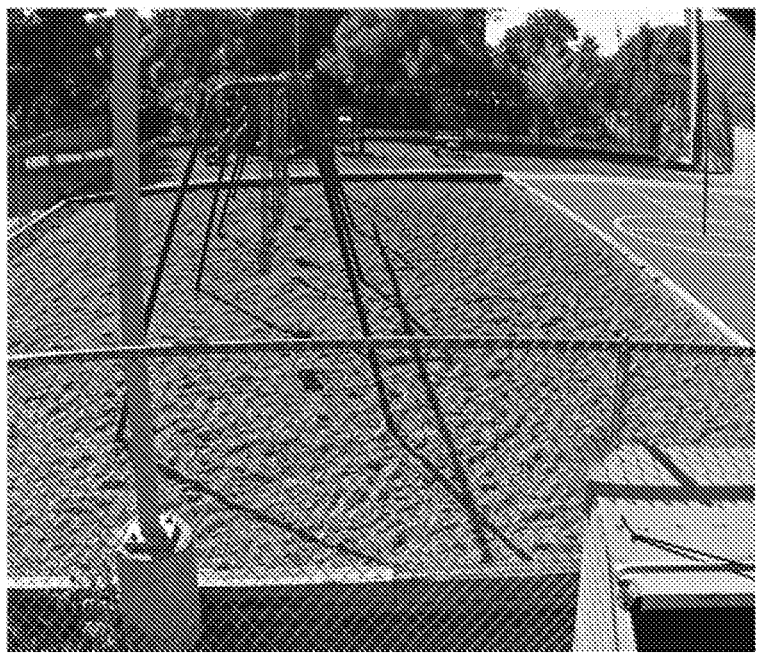
FIGS. 6A-6B depict another example of street level images according to example embodiments of the present disclosure.
Figure 6B:
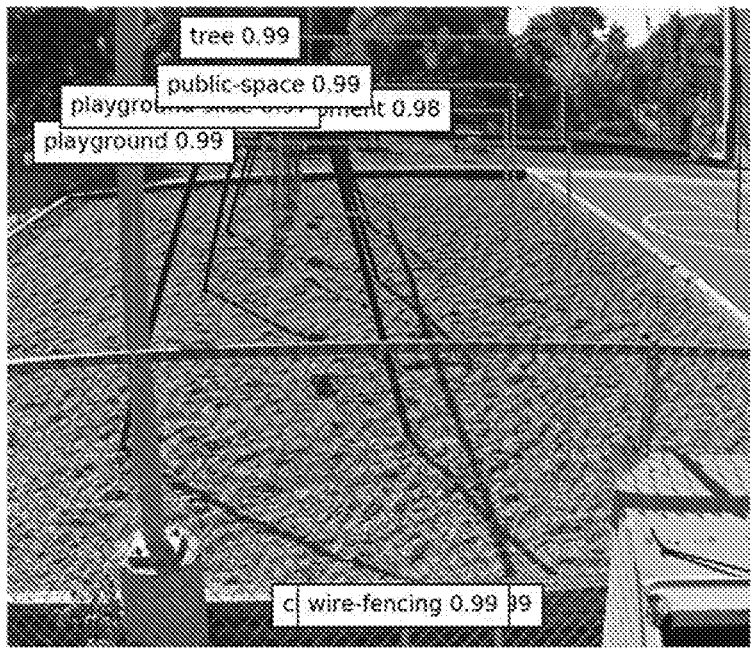

FIGS. 6A and 6B depict example street level imagery according to example embodiments of the present disclosure. As illustrated in FIG. 6A, a street-level image 600A can be obtained as part of an imagery corpus and processed by an image content analysis system (e.g., image content analysis engine 132 of FIG. 1) to identify features and/or attributes as illustrated in image 600B of FIG. 6B. In particular, an image content analysis system may identify various features within image 600A/600B, such as identifying that the image is associated with attributes of a public space and/or playground, that the image contains features identified as playground equipment, fencing, and/or the like. The image 600A/600B may be associated with a location cell within the geo-semantic index and the features/attributes identified may be used to generate and/or update data associated with the location cell within the geo-semantic index (e.g., generating/updating activity scores for a location cell associated with the image, etc.).

Example Methods

Figure 4:
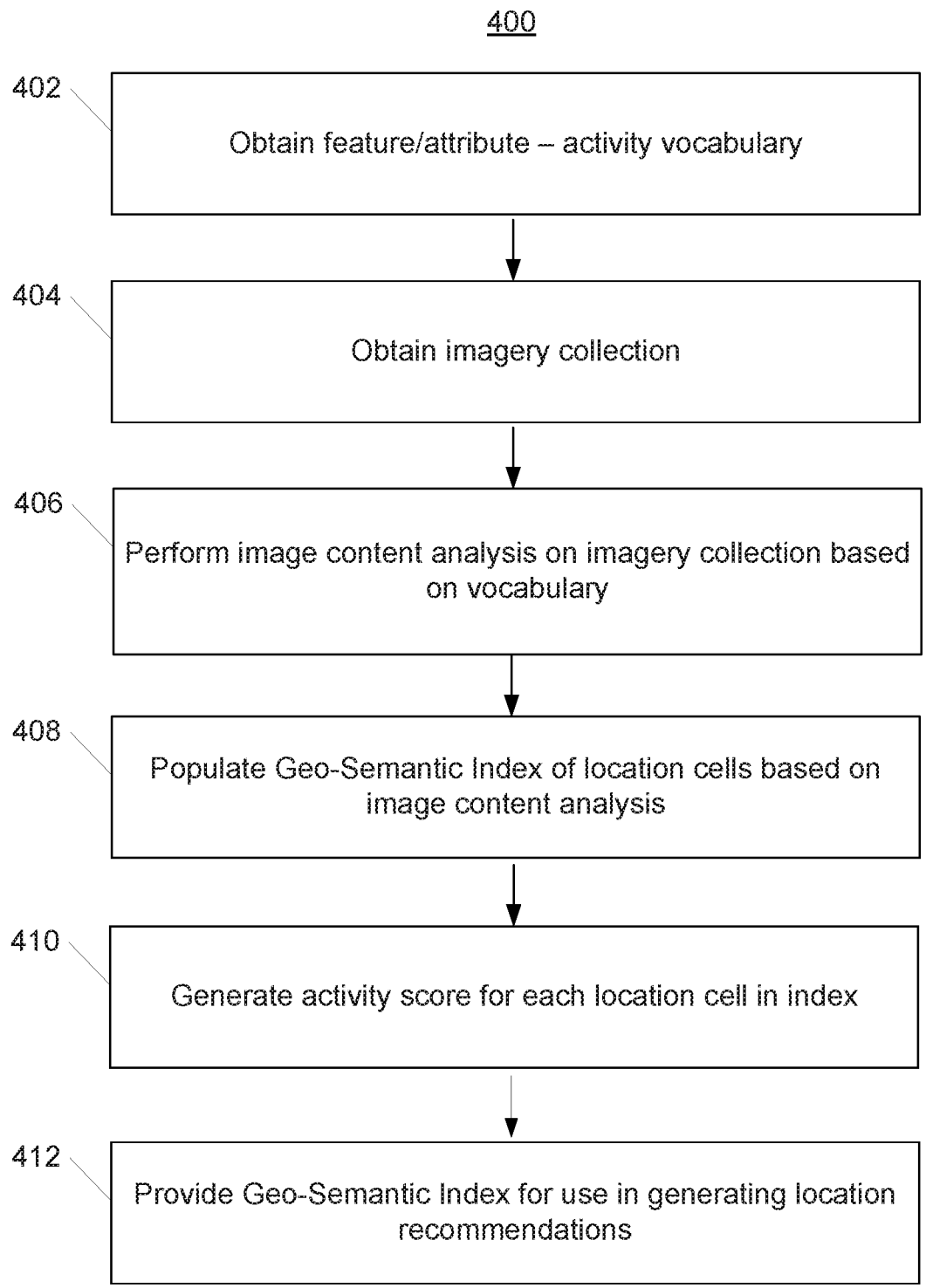
FIG. 4 depicts a flowchart diagram of an example method of providing search recommendations based on a geo-semantic index according to example embodiments of the present disclosure.

FIG. 4 depicts a flowchart diagram of an example method 400 of providing search recommendations based on a geo-semantic index according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure. Method 400 can be implemented by one or more computing devices, such as one or more of the computing devices depicted in FIG. 1.

At 402, method 400 can include obtaining, for example by a computing device such as server computing system 120 of FIG. 1, a vocabulary of feature types (e.g., a vocabulary which associates features/attributes identified in imagery with activity types that can be accommodated by the features/attributes). In particular, the computing device can facilitate cataloguing a vocabulary of known feature and/or attribute types, for example, from an image content analysis lexicon, etc., along with one or more user activity types that the feature and/or attribute types can accommodate. For example, a vocabulary of feature/attribute types could include "bench" for reading; "alley" for walking; "loading zone" or "parking meter" for a passenger pick-up or parking;

"statue," "fountain," or "boutique" for meet-ups; and/or the like. The feature/attribute vocabulary can have a many-to-many relationship between activities and feature/attribute terms.

At 404, method 400 can include obtaining, by the computing device, a corpus of imagery, such as street-level imagery, aerial imagery, and/or the like that is collected periodically. For example, the computing device can periodically obtain collections of imagery for example, from a continuously updated imagery corpus, publicly available imagery, user-generated imagery, and/or the like.

At 406, method 400 can include performing, by the computing device, image content analysis on the imagery collection based at least in part on the vocabulary of feature types. For instance, the computing device can perform image content analysis on the obtained imagery to identify feature/attribute type terms from the generated vocabulary (e.g., identify semantic elements which refer to features and/or attributes of the physical landscape that are associated with user activities). In some implementations, for example, image content analysis may include using one or more machine-learned models to identify one or more features/attributes within images include in the imagery collection.

As an example, obtained imagery can be processed by the image content analysis system to identify one or more features/attributes located within the imagery that are associated with the vocabulary (e.g., vocabulary associating features/attributes with activities accommodated by the features/attributes) of the geo-semantic index. The one or more features/attributes identified within the imagery can be matched to one or more user activities associated with and/or accommodated by the features, for example, using the vocabulary associated with the geo-semantic index.

At 408, method 400 can include populating and/or updating, by the computing device, a geo-semantic index of location cells based on the image content analysis of the imagery collection. In particular, images within the imagery collection can be identified with particular location cells mapped to a geographic area. Based on the features/attributes identified via the image content analysis for imagery associated with a location cell, the computing device can populate and/or update a geo-semantic index of the location cells, based in part on the on the vocabulary of feature types. For example, the geo-semantic index may be populated based on data associated with feature/attribute types associated with each location cell, activity types associated with the features/attributes in each location cell, and/or the like. In some implementations, the geo-semantic index may also include data regarding collection times for the imagery having the identified features/attributes. In some implementations, the image content analysis and/or population of the geo-semantic index may include filtering out certain image data, such as features/attributes identified in private and/or restricted areas, and/or the like.

At 410, method 400 can include generating, by the computing device, one or more activity scores for each location cell (e.g., associated with each activity that may be accommodated by features/attributes identified in the location cell). In particular, the computing device can generate one or more weighted activity scores for each location cell (e.g., for each activity supported by the vocabulary) based at least in part on the amount, diversity, and/or recency of the feature/attribute types corresponding to the activities that are associated with the location cell.

In some implementations, the activity scores can be generated based on one or more metric definitions provided by a client application associated with that activity. For example, in some implementations, some of the activities in the geo-semantic index and/or vocabulary may be defined solely based on the needs of a specific user application that defines the activity and the metric for the activity score. In some implementations, the activity scoring can be different based on the type of activity, the type of application, and/or the like, for example, based on the elements that may be important or essential to the activity.

As an example, in some implementations, the geo-semantic index may include, for each location cell, data indicative of one or more features/attributes identified in imagery associated with the location cell (e.g., bench, path, fountain, mural, parking meter, playground, etc.), data regarding of collection time(s) (e.g., timestamps, etc.) of analyzed images having the identified features/attributes, one or more activity scores for user activities associated with and/or accommodated by the identified features/attributes in a location cell, one or more textual descriptions based on the features/attributes and/or activities associated with the location cell, and/or the like.

At 412, method 400 can include providing, by the computing device, the geo-semantic index for use in generating map recommendations, for example, in response to user queries received from a user computing device with regard to desired activities, etc.

For example, the computing device may obtain a query from a user with regard to nearby locations that can accommodate a particular user activity. The computing device can analyze the geo-semantic index to identify one or more high scoring location cells that are nearby (e.g., within a fixed radius of the search area indicated by the user, around the user current location, etc.) and provide data associated with one or more of those locations that match the desired activity as search recommendations.

According to aspects of the present disclosure, the image content analysis and updating of a geo-semantic index can be performed iteratively based on periodic collection of new imagery.

Figure 5:
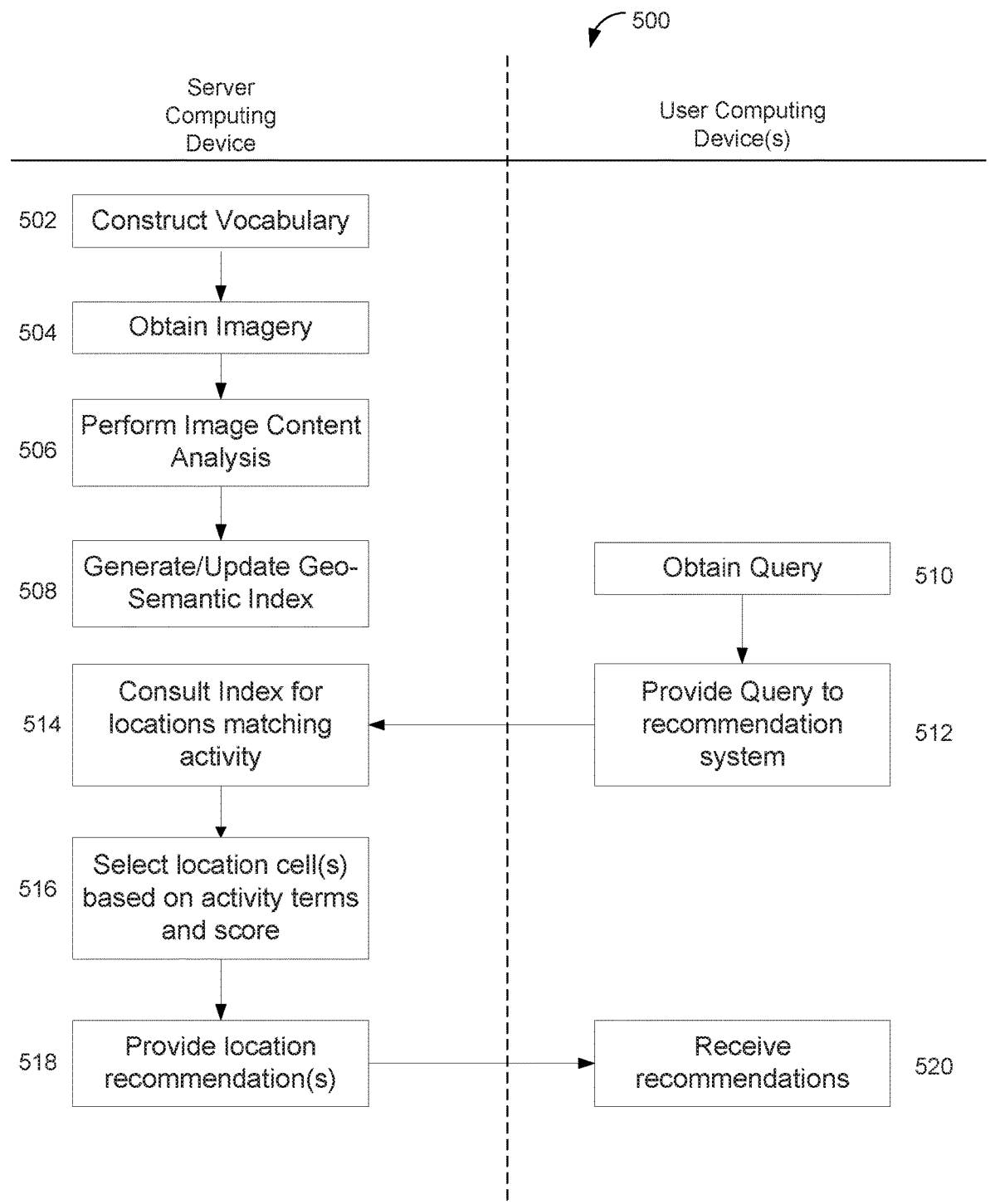
FIG. 5 depicts a flowchart diagram of an example method of providing search recommendations based on a geo-semantic index according to example embodiments of the present disclosure.

FIG. 5 depicts a flowchart diagram of an example method 500 of providing search recommendations based on a geo-semantic index according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure. Method 500 can be implemented by one or more computing devices, such as one or more of the computing devices depicted in FIG. 1.

At 502, method 500 can include generating, by a server computing device a vocabulary of feature types. For example, the server computing device can facilitate constructing a vocabulary of known feature and/or attribute types, for example, from an image content analysis lexicon, etc., along with one or more user activity types that the feature and/or attribute types can accommodate. For example, a vocabulary of feature types could include "bench" for reading; "alley" for walking; "loading zone" or "parking meter" for a passenger pick-up or parking; "statue," "fountain," or "boutique" for meet-ups; and/or the like. The feature/attribute vocabulary can have a many-to-many relationship between activities and feature/attribute terms.

At 504, method 500 can include obtaining, by the server computing device, a corpus of imagery, such as street-level imagery, aerial imagery, and/or the like. For example, the computing device can periodically obtain collections of imagery for example, from a continuously updated imagery corpus, publicly available imagery, user-generated imagery, and/or the like.

At 506, method 500 can include performing, by the server computing device, image content analysis on the imagery corpus based at least in part on the vocabulary of feature types. For instance, the server computing device can perform image content analysis on the obtained imagery to identify feature/attribute type terms from the generated vocabulary (e.g., identify semantic elements which refer to features and/or attributes of the physical landscape associated with user activities). For example, the server computing device may determine whether corresponding imagery for each of a plurality of location cells of a geo-semantic index includes feature/attribute types from the vocabulary.

At 508, method 500 can include generating and/or updating, by the server computing device, a geo-semantic index of location cells based on the image content analysis of images within the imagery collection. In particular, images within the imagery collection can be identified with particular location cells mapped to a geographic area. Based on the features/attributes identified via the image content analysis for each image associated with a location cell, the server computing device can populate and/or update a geo-semantic index of the location cells, based in part on the on the vocabulary of feature types. The server computing device can also generate/update one or more activity scores for each location cell of the geo-semantic index (e.g., associated with each activity that may be accommodated by features/attributes identified in the location cell).

At 510, method 500 can include the user computing device obtaining data associated with a query (e.g., from a user, application, etc.) regarding nearby locations that can accommodate a particular user activity. For example, a user may submit a search query at the user computing device such as "Find a place where I can walk and enjoy some shade." At 512, method 500 can include the user computing device providing data associated with the query to the server computing device.

At 514, method 500 can include the server computing device analyzing the geo-semantic index to determine one or more locations that may match the desired user activity. For example, the server computing device can analyze the geo-semantic index to identify one or more location cells that are nearby (e.g., within a fixed radius of the search area indicated by the user, around the user current location, etc.). At 516, method 500 can include the server computing device selecting one or more locations from the identified location cells. For example, the server computing device can select one or more location cells from the identified location cells that have activity scores associated with the desired activity that are above a certain threshold score (e.g., a certain number of location cells from the identified cells with the highest activity scores for the desired activity).

For example, the server computing device can screen the query submission for any known activity words associated with the vocabulary. For instance, the server computing device could identify "walk" and "enjoy shade" as activity terms in the vocabulary. The server computing device can analyze the index to identify one or more location cells that have a high match for these activities based on the presence of certain vocabulary terms being associated with the cells based on an image content analysis of the imagery. Thus, the identified cell locations may have among their descriptive features terms such as "alley," "trees," "sidewalk," "gravel path," and/or other similar terms. The computing system can select one or more of the identified locations, for example, based in part of the activity scores associated with the identified location cells.

At 518, method 500 can include the server computing device providing data associated with the one or more recommended locations to the user computing device. For example, the server computing device may provide data indicative of a map of the selected locations, a listing of the selected locations, and or the like. In some implementations, for each location, the server computing system can generate a textual description based on the features/attributes and/or activities associated with the location. For example, in some implementations, such descriptions can be generated based on an application of natural language processing, can be curated by human operators, and/or the like. These location descriptions can be provided to the user as part of the location recommendations to assist the user in selecting and/or finding the desired location.

At 520, method 500 can include the user computing device receiving the recommendation data from the server computing device and providing the recommendation data to the user.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

One example embodiment of the present disclosure is directed to a computer-implemented method that includes obtaining, by one or more computing devices, a vocabulary of image feature types associated with user activities. The method includes obtaining, by the one or more computing devices, a collection of imagery. The method includes performing, by the one or more computing devices, image content analysis on the collection of imagery based on the vocabulary of image feature types. The method includes generating, by the one or more computing devices, at least one activity score for each of a plurality of location cells in a geo-semantic index based at least in part on the vocabulary of image feature types. The method includes populating, by the one or more computing devices, the geo-semantic index of location cells, the geo-semantic index of location cells including data indicative of the at least one activity score for each location cell. The method includes providing, by the one or more computing devices, the geo-semantic index of location cells for use in generating location recommendations in response to a query.

The method may further include wherein generating, by the one or more computing devices, the at least one activity score for each of the location cells includes: generating the at least one activity score for each location cell based at least in part on corresponding image feature types identified by the image content analysis. The method may further include associating, by the one or more computing devices, each activity type of a plurality of activity types with a respective subset of image feature types from the vocabulary of image feature types; wherein performing, by the one or more computing devices, the image content analysis on the collection of imagery includes determining whether corresponding imagery for each location cell includes feature types from the vocabulary of image feature types; and wherein generating, by the one or more computing devices, the at least one activity score for each of the location cells includes determining an activity score for each activity type based at least in part on whether such location cell includes the respective subset of image feature types for such activity type. The method may further include wherein a first location cell can include a first activity score associated with a first activity type and a second activity score for a second activity type, and wherein the first activity score is based in part on identifying a first subset of feature types associated with the first location cell and the second activity score is based in part on identifying a second subset of feature types associated with the first location cell. The method may further include obtaining, by the one or more computing devices, a query for location recommendations for a desired activity; obtaining, by the one or more computing devices, the geo-semantic index of location cells; determining, by the one or more computing devices, one or more location cells within a geographic area associated with the query based on an activity score associated with the desired activity from the geo-semantic index of location cells; and providing, by the one or more computing devices, a recommendation including one or more selected locations based on the determined location cells. The method may further include obtaining, by the one or more computing devices, a query for activity recommendations within a defined geographic area; obtaining, by the one or more computing devices, the geo-semantic index of location cells; determining, by the one or more computing devices, one or more user activities associated with location cells within the defined geographic area based in part on activity scores associated with the one or more user activities in the geo-semantic index of location cells; and providing, by the one or more computing devices, a recommendation including the one or more user activities determined based in part on the activity scores and a location within the defined geographic area for each of the one or more user activities. The method may further include generating, by the one or more computing devices, a description for a location cell based in part on feature types and activities associated with the location cell as identified by the content image analysis. The method may further include filtering out, by the one or more computing devices, feature types identified by the image content analysis that are identified in restricted geographic locations such that they are not populated in the geo-semantic index. The method may further include wherein generating, by the one or more computing devices, an activity score for each of the location cells in the geo-semantic index based on supported user activities includes generating a weighted activity score for each location cell based at least in part on an amount, diversity, and recency of identified image feature types corresponding to activities that are associated with the location cell. The method may further include wherein obtaining, by the one or more computing devices, a vocabulary of image feature types associated with user activities includes cataloguing a vocabulary of known feature types from an image content analysis lexicon along with user activities that the feature types can accommodate. The method may further include wherein the collection of imagery incudes a periodic collection of street-level imagery.

Another example embodiment of the present disclosure is directed to a computing device. The computing device includes one or more processors. The computing device includes one or more non-transitory computer-readable media that collectively store instructions that, when executed by the one or more processors, cause the computing device to perform operations. The operations include obtaining a vocabulary of image feature types associated with user activities. The operations include obtaining a collection of imagery. The operations include performing image content analysis on the collection of imagery based on the vocabulary of image feature types. The operations include generating at least one activity score for each of a plurality of location cells in a geo-semantic index based at least in part on the vocabulary of image feature types. The operations include populating the geo-semantic index of location cells, the geo-semantic index of location cells including data indicative of the at least one activity score for each location cell. The operations include providing the geo-semantic index of location cells for use in generating location recommendations in response to a query.

Another example embodiment of the present disclosure is directed to one or more non-transitory computer-readable media that store instructions that, when executed by one or more processors of a computing system, cause the computing system to perform operations. The operations include obtaining a vocabulary of image feature types associated with user activities. The operations include obtaining a collection of imagery. The operations include performing image content analysis on the collection of imagery based on the vocabulary of image feature types. The operations include generating at least one activity score for each of a plurality of location cells in a geo-semantic index based at least in part on the vocabulary of image feature types. The operations include populating the geo-semantic index of location cells, the geo-semantic index of location cells including data indicative of the at least one activity score for each location cell. The operations include providing the geo-semantic index of location cells for use in generating location recommendations in response to a query.

What is claimed is:

1. A computer-implemented method, the method comprising:
   obtaining, by one or more computing devices, a vocabulary of image feature types associated with user activities;
   obtaining, by the one or more computing devices, a collection of imagery;
   performing, by the one or more computing devices, image content analysis on the collection of imagery based on the vocabulary of image feature types;
   generating, by the one or more computing devices, at least one activity score for each of a plurality of location cells in a geo-semantic index based at least in part on the vocabulary of image feature types;

populating, by the one or more computing devices, the geo-semantic index of location cells, the geo-semantic index of location cells including data indicative of the at least one activity score for each location cell; and providing, by the one or more computing devices, the geo-semantic index of location cells for use in generating location recommendations in response to a query.

2. The computer-implemented method of claim 1, wherein generating, by the one or more computing devices, the at least one activity score for each of the location cells includes:

generating the at least one activity score for each location cell based at least in part on corresponding image feature types identified by the image content analysis.

3. The computer-implemented method of claim 1, wherein the method further comprises:

associating, by the one or more computing devices, each activity type of a plurality of activity types with a respective subset of image feature types from the vocabulary of image feature types;

wherein performing, by the one or more computing devices, the image content analysis on the collection of imagery comprises determining whether corresponding imagery for each location cell includes feature types from the vocabulary of image feature types; and wherein generating, by the one or more computing devices, the at least one activity score for each of the location cells comprises determining an activity score for each activity type based at least in part on whether such location cell includes the respective subset of image feature types for such activity type.

4. The computer-implemented method of claim 1, wherein a first location cell includes a first activity score associated with a first activity type and a second activity score for a second activity type, and wherein the first activity score is based at least in part on identifying a first subset of feature types associated with the first location cell and the second activity score is based at least in part on identifying a second subset of feature types associated with the first location cell.

5. The computer-implemented method of claim 1, wherein the method further comprises:

obtaining, by the one or more computing devices, a query for location recommendations for a desired activity;

obtaining, by the one or more computing devices, the geo-semantic index of location cells;

determining, by the one or more computing devices, one or more location cells within a geographic area associated with the query based on an activity score associated with the desired activity from the geo-semantic index of location cells; and providing, by the one or more computing devices, a recommendation including one or more selected locations based on the determined location cells.

6. The computer-implemented method of claim 1, wherein the method further comprises:

obtaining, by the one or more computing devices, a query for activity recommendations within a defined geographic area;

obtaining, by the one or more computing devices, the geo-semantic index of location cells;

determining, by the one or more computing devices, one or more user activities associated with location cells within the defined geographic area based in part on activity scores associated with the one or more user activities in the geo-semantic index of location cells; and providing, by the one or more computing devices, a recommendation including the one or more user activities determined based in part on the activity scores and a location within the defined geographic area for each of the one or more user activities.

7. The computer-implemented method of claim 1, wherein the method further comprises:

generating, by the one or more computing devices, a description for a location cell based in part on feature types and activities associated with the location cell as identified by the content image analysis.

8. The computer-implemented method of claim 1, wherein the method further comprises:

filtering out, by the one or more computing devices, feature types identified by the image content analysis that are identified in restricted geographic locations such that they are not populated in the geo-semantic index.

9. The computer-implemented method of claim 1, wherein generating, by the one or more computing devices, an activity score for each of the location cells in the geo-semantic index based on supported user activities comprises generating a weighted activity score for each location cell based at least in part on an amount, diversity, and recency of identified image feature types corresponding to activities that are associated with the location cell.

10. The computer-implemented method of claim 1, wherein obtaining, by the one or more computing devices, a vocabulary of image feature types associated with user activities comprises cataloguing a vocabulary of known feature types from an image content analysis lexicon along with user activities that the feature types can accommodate.

11. The computer-implemented method of claim 1, wherein the collection of imagery comprises a periodic collection of street-level imagery.

12. A computing system, comprising:

one or more processors; and one or more non-transitory computer-readable media that store instructions that, when executed by the one or more processors, cause the computing system to perform operations, the operations comprising:

obtaining a vocabulary of image feature types associated with user activities;

obtaining a collection of imagery;

performing image content analysis on the collection of imagery based on the vocabulary of image feature types;

generating at least one activity score for each of a plurality of location cells in a geo-semantic index based at least in part on the vocabulary of image feature types;

populating the geo-semantic index of location cells, the geo-semantic index of location cells including data indicative of the at least one activity score for each location cell; and providing the geo-semantic index of location cells for use in generating location recommendations in response to a query.

13. The computing system of claim 12, wherein generating the at least one activity score for each of the location cells includes generating the at least one activity score for each location cell based at least in part on corresponding image feature types identified by the image content analysis.

14. The computing system of claim 12, the operations further comprising:
obtaining a query for location recommendations for a desired activity;
obtaining the geo-semantic index of location cells;
determining one or more location cells within a geographic area associated with the query based on an activity score associated with the desired activity in the geo-semantic index of location cells; and
providing a recommendation including one or more selected locations based on the determined location cells.

15. The computing system of any of claim 12, the operations further comprising:
generating a description for a location cell based in part on feature types and activities associated with the location cell as identified by the content image analysis.

16. The computing system of any of claim 12, wherein generating an activity score for each of the location cells in the geo-semantic index based on supported user activities comprises generating a weighted activity score for each location cell based at least in part on an amount, diversity, and recency of semantic terms corresponding to activities that are associated with the location cell.

17. One or more non-transitory computer-readable media that store instructions that, when executed by one or more processors of a computing system, cause the computing system to:
obtain a vocabulary of image feature types associated with user activities;
obtain a collection of imagery;
perform image content analysis on the collection of imagery based on the vocabulary of image feature types;
generate at least one activity score for each of a plurality of location cells in a geo-semantic index based at least in part on the vocabulary of image feature types;
populate the geo-semantic index of location cells, the geo-semantic index of location cells including data indicative of the at least one activity score for each location cell; and
provide the geo-semantic index of location cells for use in generating location recommendations in response to a query.

18. The one or more non-transitory computer-readable media of claim 17, further causing the computing system to:
obtain a query for location recommendations for a desired activity;
obtain the geo-semantic index of location cells;
determine one or more location cells within a geographic area associated with the query based on an activity score associated with the desired activity in the geo-semantic index of location cells; and
provide a recommendation including one or more selected locations based on the determined location cells.

19. The one or more non-transitory computer-readable media of claim 17, further causing the computing system to:
generate a description for a location cell based in part on features and activities associated with the location cell as identified by the content image analysis.

20. The one or more non-transitory computer-readable media of claim 17, wherein the collection of imagery comprises a periodic collection of street-level imagery.

* * * * *